Nov. 26, 1957 — W. L. HAWKINS — 2,814,161
PLANT RECEPTACLE
Filed July 29, 1955 — 2 Sheets-Sheet 1

INVENTOR.
WINIFRED L. HAWKINS
BY McMorrow, Berman & Davidson
ATTORNEYS

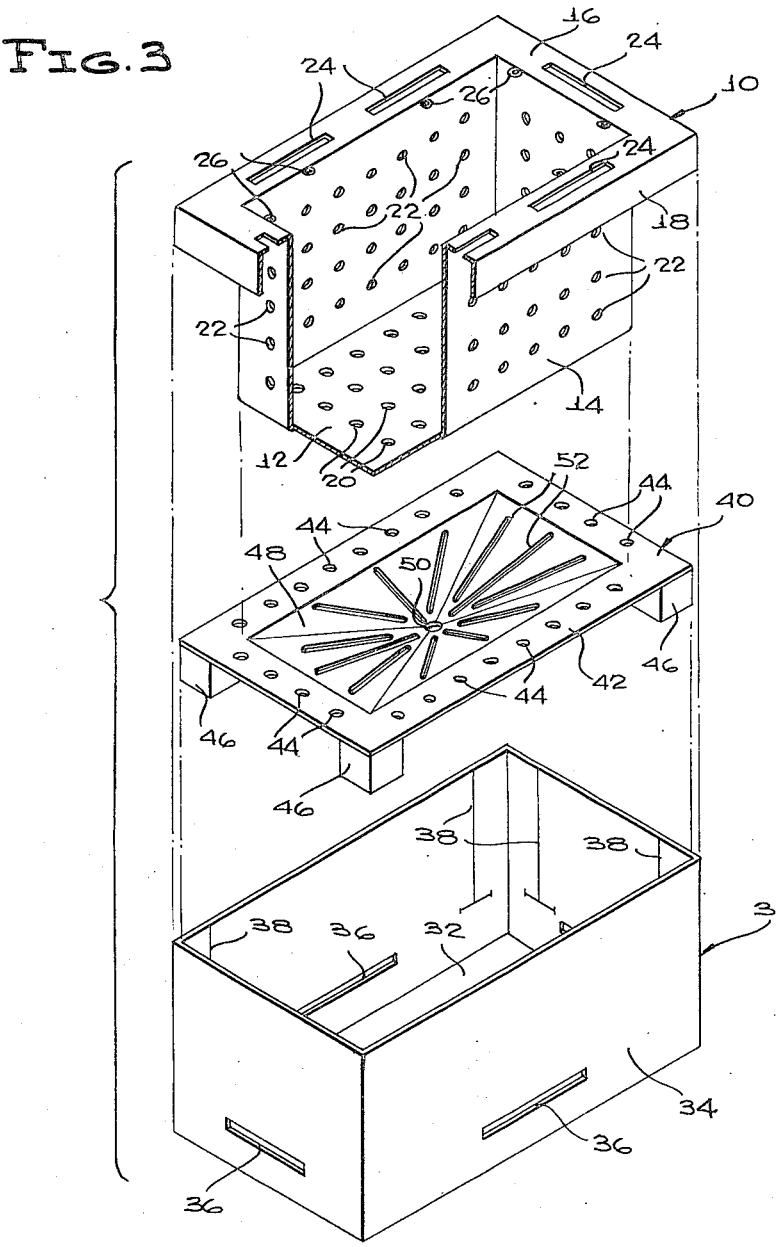

United States Patent Office 2,814,161
Patented Nov. 26, 1957

2,814,161

PLANT RECEPTACLE

Winifred L. Hawkins, Cayuga, Ind.

Application July 29, 1955, Serial No. 525,172

3 Claims. (Cl. 47—38)

This invention relates to a plant receptacle and has for its primary object to facilitate the trimming of the roots of a dwarf plant such as a Ming tree or the like.

It is well known that in the culture of dwarf trees, such as the one above mentioned, it is necessary that the roots be cut to prevent overgrowth of the tree. In the cutting of the roots of such plants it has heretofore been necessary to unpot the plant, cut the roots and then repot the plant. Such a practice is not only laborious on the part of the attendant, but frequently results in the loss of the plant. In order to overcome such a condition, it has heretofore been the practice of many engaged in the culture of dwarf trees to plant the seeds thereof in a perforate plant receiver and as the roots of the plants protruded through the receiver to cut them off flush with the receiver. Such practices left the roots exposed to atmosphere and in many instances resulted in damage to or loss of the plant.

The primary object of this invention is to protect the cut roots from atmospheric injury and afford an adequate supply of moisture to the severed root of the tree or plant.

Another object is to enable the roots of the plants to be severed without requiring the unpotting and repotting of the plants.

The above and other objects may be attained by employing this invention which embodies among its features a hollow perforated plant receiver, an imperforate container surrounding the plant receiver in spaced relation thereto, and a comminuted filler of inert moisture retaining material between the receiver and the container for protecting the severed ends of roots of a plant planted in the plant receiver.

Other features include a cap closing the upper end of the chamber surrounding the plant receiver, said cap having knife blade receiving slots extending therethrough which lie parallel to and immediately adjacent the plant receiver, and said container having knife blade receiving slots extending therethrough adjacent the bottom of the plant receiver.

Other features include a false bottom in the container in spaced relation to the bottom thereof for supporting the bottom of the plant receiver in spaced relation to the bottom of the container, and said false bottom inclining downwardly toward its center and having drainage openings extending therethrough.

Still other features include eyes carried by the plant receiver and projecting inwardly therefrom adjacent the upper end thereof above the liner of comminuted inert moisture retaining material contained in the plant receiver.

In the drawings:

Figure 3 is an exploded perspective view of the plant receptacle.

Figure 1:
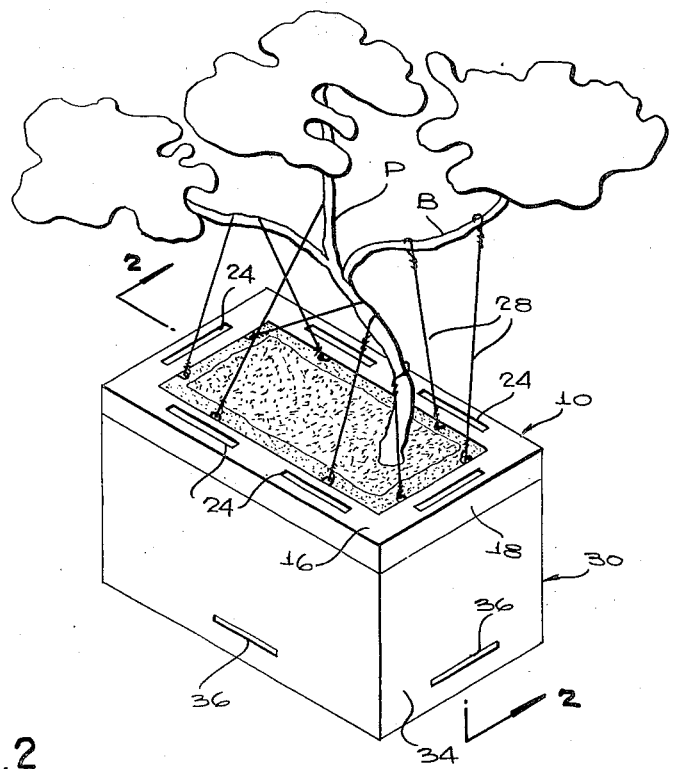
Figure 1 is a perspective view of a plant receiver embodying this invention and showing a dwarf plant such as a Ming tree, growing therein.

Referring to the drawings in detail, a plant receiver designated generally 10 which may be rectangular, as illustrated, or of any other suitable shape comprises a bottom 12 from which projects upwardly a side wall 14 which terminates at its upper end in an outstanding flange 16. Carried by the flange and extending downwardly therefrom in spaced relation to the side wall 14 is a supporting flange 18 which is adapted to engage the upper edge of an imperforate container to be more fully hereinafter described. The bottom 12 is provided with spaced perforations 20 and similarly spaced perforations 22 extend through the side wall 14 and together with the perforations 20 provide openings through which the roots R of a plant P may protrude, as suggested in Figure 2. Extending through the flange 16 at the upper end of the side wall 14 and lying adjacent said side wall are slots 24 which are adapted to receive the blade of a knife used to sever the portions p of the roots R which project through the perforations 20 and 22. Carried by and extending inwardly from the side wall 14 adjacent the upper edge thereof are spaced eyes 26 which project inwardly from said side wall and provide anchors for cords or cables 28 which are employed to retain the branches B of the plant P in selected positions, as suggested in Figure 1.

Figure 2:
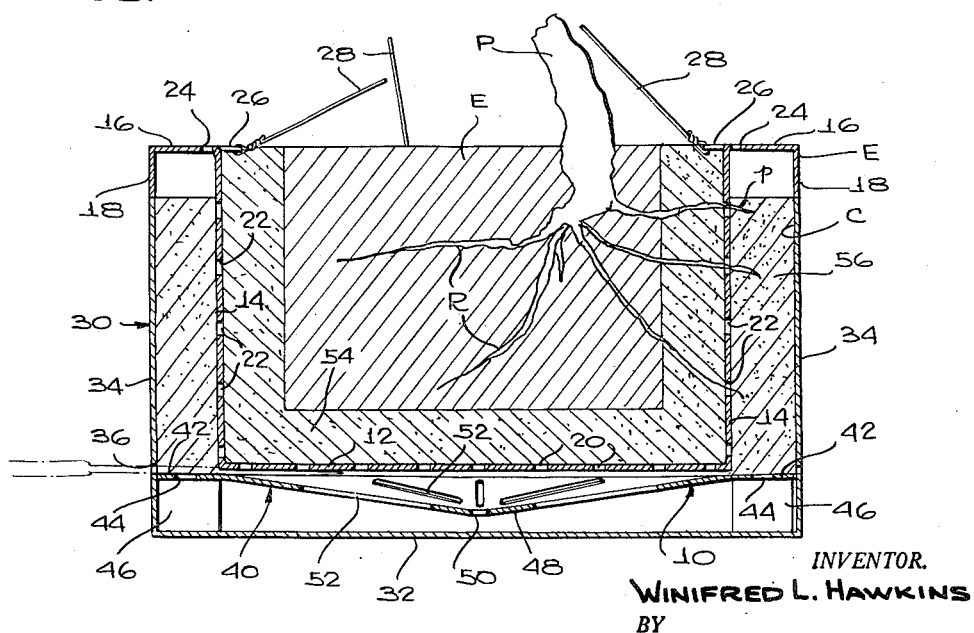
Figure 2 is a fragmentary enlarged sectional view taken substantially on the line 2—2 of Figure 1.

A container designated generally 30 is adapted to receive the plant receiver 10 and comprises an imperforate bottom 32 and an upwardly extending side wall 34 upon the upper edge of which rests the lower edge of the supporting flange 18. Extending through the side wall 34 in upwardly spaced relation to the bottom 32 are elongated horizontal slots 36, and the interior of the container 30 is provided with indices, the purposes of which will hereinafter appear. As shown in Figure 2, when the parts are assembled, the bottom 12 of the plant receiver 10 lies in a plane with or slightly above the top edges of the slots 36.

A false bottom designated generally 40 is adapted to fit within the container 30 and comprises a flange 42 having a row of perforations 44 extending therethrough. Secured to the flange on the underside thereof are feet 46 which extend downwardly therefrom and engage the bottom 32 of the container 30. Carried by the flange and extending downwardly therefrom toward the center of the container 34 is a web 48 having a central drainage opening 50 extending therethrough and extending through said web and converging toward the drainage opening 50 are drainage slots 52. In the preferred form of the invention the flange 42 lies slightly below the bottom 12 of the plant receiver 10 so that a knife may be inserted through a slot 36 to sever any roots which protrude through the openings 20.

A liner 54 of a comminuted inert moisture retaining material, such as a mixture of one-half of peat moss and one-half vermiculite is introduced into the plant receiver adjacent the bottom 12 and wall 14 thereof and earth E is introduced into the cavity defined on the interior of the plant receiver 10 by the comminuted lining. A filler 56 of comminuted material such as that previously described is introduced into the chamber C defined between the walls 14 and 34 and the flange 42 to receive the tips of roots R which protrude through the liner 54 and openings 22 into the chamber C. As illustrated in Figure 2, the comminuted material 56 does not project above the upper edge of the wall 34 to define an expansion chamber E adjacent the upper end of the chamber C so that any swelling or expansion of the comminuted material through contact with water may be accommodated.

In use, the plant P is planted in the earth E in the cavity defined within the lining 54 of the plant receiver 10 and as the plant grows, the limbs thereof may be restrained by the cables 28 previously described and as the roots R project their tips through the openings 20 or 22 of the plant receiver, they will protrude into the chamber C and enter the filler 56 which being of comminuted material will facilitate the engagement of the roots R by the blade of a knife extended through a slot 24, or a slot 36. The filler 56 will protect the ends of the roots R from which the tips have been severed from contact with atmosphere and consequently prevent atmospheric damage to the roots. Likewise, the moisture contained within the container 30 below the bottom 12 of the plant receiver 10 will supply moisture to the ends of the roots exposed through the openings 20 in the bottom 12 of the plant receiver.

From the foregoing, it will be evident that the plant P planted in the earth E contained within the liner 54 will grow in the customary manner with the roots R spreading through the earth E and penetrating the liner 54 to be extended through one or more of the openings 22 in the wall 14 of the plant receiver. With the parts assembled, as illustrated, it is evident that moisture entering the earth E will penetrate the liner 54 and filler 56 to be retained therein in order to supply adequate moisture to the roots R of the plant P for its growth. As previously explained, as the tips of the roots R protrude through the openings 22 and the wall 14, a knife blade may be extended through a selected slot 24 so as to sever the protruding tips of the roots from the roots. In this way, the growth of the plant P may be controlled and its dwarf or miniature characteristics well preserved.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A plant receptacle comprising a hollow perforated plant receiver, an imperforate container surrounding the plant receiver in spaced relation thereto and defining a chamber surrounding the plant receiver, a comminuted filler of inert moisture retaining material in the chamber, a cap closing the upper end of the chamber, and said cap having elongated knife blade receiving slots extending therethrough which lie parallel to and immediately adjacent the plant receiver.

2. A plant receptacle comprising a hollow plant receiver having plant root receiving perforations extending through its bottom and side walls, a comminuted lining of inert moisture retaining material within the receiver adjacent the bottom and side walls thereof, said lining defining an earth receiving cavity, a container surrounding the plant receiver in spaced relation thereto and defining therewith a chamber which surrounds the plant receiver, a filler of comminuted moisture retaining material in the chamber whereby ends of the roots of plants protruding through the perforations in the plant receiver will be protected from atmosphere, and said chamber having elongated slots extending therethrough for receiving a knife blade used in severing the portions of the roots of a plant which protrude through the bottom of the plant receiver.

3. A plant receptacle comprising a hollow perforated plant receiver, an imperforate container surrounding the plant receiver in spaced relation thereto, a comminuted filler of inert moisture retaining material between the receiver and the container, a false bottom in the container in spaced relation to the bottom thereof for supporting the bottom of the plant receiver in spaced relation to the bottom of the container, and said container having knife blade receiving slots extending therethrough adjacent the bottom of the plant receiver.

References Cited in the file of this patent

UNITED STATES PATENTS

| | | |
|---|---|---|
| 1,077,423 | Myers | Nov. 4, 1913 |
| 1,426,808 | Bailey | Aug. 22, 1922 |
| 1,635,203 | Brosnick | July 12, 1927 |
| 2,089,220 | Norman | Aug. 10, 1937 |
| 2,094,513 | Wilson et al. | Sept. 28, 1937 |
| 2,113,523 | White | Apr. 5, 1938 |

FOREIGN PATENTS

| | | |
|---|---|---|
| 693,069 | Great Britain | June 24, 1953 |